(12) United States Patent
Adefris

(10) Patent No.: US 11,702,576 B2
(45) Date of Patent: Jul. 18, 2023

(54) ABRASIVE PARTICLE WITH ENHANCED RETENTION FEATURES

(71) Applicant: 3M INNOVATIVE PROPERTIES COMPANY, St. Paul, MN (US)

(72) Inventor: Negus B. Adefris, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/301,078

(22) Filed: Mar. 24, 2021

(65) Prior Publication Data

US 2021/0214597 A1     Jul. 15, 2021

Related U.S. Application Data

(63) Continuation of application No. 16/333,370, filed as application No. PCT/US2017/052398 on Sep. 20, 2017, now Pat. No. 10,988,648.

(60) Provisional application No. 62/397,591, filed on Sep. 21, 2016.

(51) Int. Cl.
*B32B 5/16*     (2006.01)
*C09K 3/14*     (2006.01)
*B24D 3/00*     (2006.01)

(52) U.S. Cl.
CPC .............. *C09K 3/1409* (2013.01); *B24D 3/00* (2013.01); *Y10T 428/2982* (2015.01)

(58) Field of Classification Search
CPC .......... B24D 3/00; B24D 3/342; B24D 3/344; C09K 3/1409; Y10T 428/2982
See application file for complete search history.

(56) References Cited

U.S. PATENT DOCUMENTS

| | | |
|---|---|---|
| 1,910,444 A | 5/1933 | Nicholson |
| 3,041,156 A | 6/1962 | Rowse |
| 4,314,827 A | 2/1982 | Leitheiser |
| 4,997,461 A | 3/1991 | Markhoff-Matheny |
| 5,009,675 A | 4/1991 | Kunz |
| 5,011,508 A | 4/1991 | Wald |

(Continued)

FOREIGN PATENT DOCUMENTS

| | | |
|---|---|---|
| EP | 2692814 | 2/2014 |
| WO | WO 2013-151745 | 10/2013 |

(Continued)

OTHER PUBLICATIONS

Vision Analytical Brochure, Particle Shape Application Example: Diamond Abrasives (Year: 2012).

(Continued)

*Primary Examiner* — Hoa (Holly) Le
(74) *Attorney, Agent, or Firm* — Katherine M. Scholz

(57) ABSTRACT

The present inventive subject matter provides an abrasive particle. The abrasive particle can include an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

20 Claims, 10 Drawing Sheets

(56) References Cited

U.S. PATENT DOCUMENTS

| | | | |
|---|---|---|---|
| 5,042,991 A | | 8/1991 | Kunz |
| 5,085,671 A | | 2/1992 | Martin |
| 5,152,917 A | | 10/1992 | Pieper |
| 5,201,916 A | | 4/1993 | Berg |
| 5,213,591 A | | 5/1993 | Celikkaya |
| 5,435,816 A | | 7/1995 | Spurgeon |
| 5,551,963 A | | 9/1996 | Larmie |
| 5,645,619 A | | 7/1997 | Erickson |
| 5,672,097 A | | 9/1997 | Hoopman |
| 5,946,991 A | | 9/1999 | Hoopman |
| 5,975,987 A | | 11/1999 | Hoopman |
| 5,984,988 A | | 11/1999 | Berg |
| 6,054,093 A | | 4/2000 | Torre, Jr. |
| 6,123,744 A | * | 9/2000 | Huzinec .................. B24D 3/06 51/293 |
| 6,129,540 A | | 10/2000 | Hoopman |
| 6,277,161 B1 | | 8/2001 | Castro |
| 8,034,137 B2 | | 10/2011 | Erickson |
| 8,142,531 B2 | | 3/2012 | Adefris |
| 9,180,573 B2 | | 11/2015 | Givot |
| 10,988,648 B2 | * | 4/2021 | Adefris ................ C09K 3/1409 |
| 2010/0319269 A1 | | 12/2010 | Erickson |
| 2012/0168979 A1 | | 7/2012 | Bauer |
| 2012/0227333 A1 | | 9/2012 | Adefris |
| 2013/0212952 A1 | | 8/2013 | Welygan |
| 2013/0236725 A1 | * | 9/2013 | Yener .................. C09K 3/1409 428/402 |
| 2014/0237907 A1 | | 8/2014 | Boden |
| 2015/0052825 A1 | | 2/2015 | Adefris |
| 2015/0089881 A1 | | 4/2015 | Stevenson |
| 2015/0218430 A1 | | 8/2015 | Yener |
| 2015/0343603 A1 | | 12/2015 | Breder |

FOREIGN PATENT DOCUMENTS

| | | |
|---|---|---|
| WO | WO 2015-048768 | 4/2015 |
| WO | WO 2014-070468 | 5/2019 |

OTHER PUBLICATIONS

International Search Report for PCT International Application No. PCT/US2017/052398, dated Feb. 7, 2018, 4 pages.

* cited by examiner

ABRASIVE PARTICLE WITH ENHANCED RETENTION FEATURES

CROSS REFERENCE TO RELATED APPLICATIONS

This application is a continuation of U.S. application Ser. No. 16/333,370, filed Mar. 14, 2019, now pending, which is a national stage filing under 35 U.S.C. 371 of PCT/US2017/052398, filed Sep. 20, 2017, which claims priority to U.S. Provisional Application No. 62/397,591, filed Sep. 21, 2016, the disclosure of which is incorporated by reference in its/their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

SUMMARY OF THE EMBODIMENTS

Embodiments of the present invention provide an abrasive particle. The abrasive particle can include an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

According to further embodiments of the present invention, a plurality of abrasive particles each includes an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

According to further embodiments of the present invention, a bonded abrasive article includes a plurality of abrasive particles. Each particle of the plurality of abrasive particles includes an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

According to further embodiments of the present invention, a method of forming an abrasive particle includes placing a starting material mixture in a mold. The method further includes curing the starting material in the mold, to provide the abrasive particle. The method further includes removing the abrasive material from the mold. The formed abrasive particle includes an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

According to further embodiments of the present invention, a method of using an abrasive particle includes incorporating the abrasive particle into a bonded abrasive article. The method further includes grinding a surface with the article. The abrasive particle includes an elongated body that is defined between opposed first and second ends. Each end defines a substantially planar surface. An axis extends through the first and second ends, and each end has a respective first and second cross-sectional area. At least one of the first and second ends is oriented at an angle relative to the axis that is less than 90 degrees. The elongated body has a variable cross-sectional area centered along the axis. At least one cross-sectional area between the first and second ends represents a local minimum cross-sectional area.

Various embodiments of the present disclosure provide certain benefits, at least some of which are unexpected. For example, according to various embodiments, the abrasive particle is less likely to be pulled out of a bonded abrasive article. In some embodiments, the variable cross-sectional area of the abrasive particle results in the first and second ends of the particle having a larger cross-sectional area than a local minimum cross-sectional area of the elongated body. In some embodiments, the first and second ends are flared and can serve as anchoring features of the particle. According to various further embodiments, the abrasive particle has a wedge-shaped profile formed from the first and second ends and optionally a few faces of the particle are tilted at an angle of less than 90 degrees. This orientation can help to make various embodiments of the abrasive particle more removable from a mold. Additionally, the facets and sharp corners of various embodiments of the abrasive particle can result in unexpected higher abrading performance compared to traditional abrasive rods.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
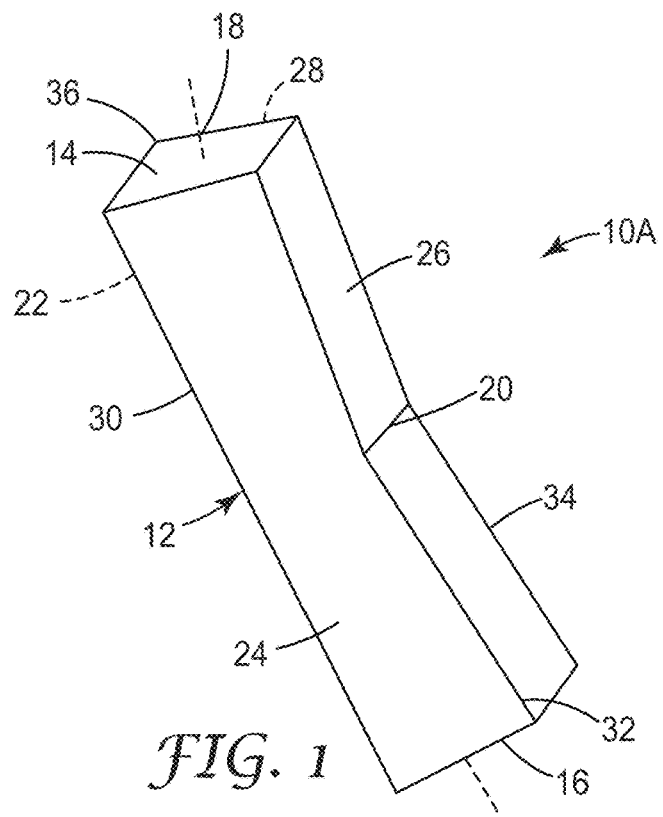
FIG. 1 is a perspective view of an abrasive particle having a trapezoidal constant cross-sectional shape and one tapered face.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the inventive subject matter, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

FIG. 1 is a perspective view of an abrasive particle 10A. Abrasive particle 10A can be formed from alpha alumina and includes elongated body 12, which is defined between opposed first end 14 and second end 16. An aspect ratio of a length to a width of abrasive particle 10A can range from about 3:1 to about 6:1, or from about 4:1 to about 5:1. Abrasive particle 10A can be formed from a molding process or through additive manufacturing.

Elongated body 12 includes axis 18, which extends through the middle of elongated body 12, first end 14, and second end 16. As illustrated, axis 18 is a non-orthogonal axis, but in other examples axis 18 can be a straight axis. As illustrated, each of first end 14 and second end 16 define a substantially planar surface. Both first end 14 and second end 16 are oriented at an angle relative to axis 18 that is less than 90 degrees, and each end is non-parallel with respect to each other. In other examples only one of the first and second ends are oriented at an angle relative to the axis that is less than 90 degrees. First end 14 and second end 16 have respective first and second cross-sectional areas. As illustrated, the first and second cross-sectional areas are substantially the same. But in other embodiments, the first and second cross-sectional areas can be different.

Elongated body 12 has a variable cross-sectional area centered along axis 18. At least one cross-sectional area between first end 14 and second end 16 represents a local minimum cross-sectional area of elongated body 12. The local minimum cross-sectional area is located at inflection point 20. Inflection point 20 is formed by elongated body 12 tapering inward from each of first end 14 and second end 16; thus elongated body 12 has a dual tapered profile. First end 14 and second end 16 are thus joined by at least one plane or curved surface that generally decreases in radius from at least one end of particle 10A to inflection point 20. As illustrated, elongated body 12 tapers according to a linear profile, but in other examples, elongated body 12 can taper according to a curved profile.

The angle that elongated body 12 tapers at with respect to axis 18 is less than 90 degrees. For example, the angle can range from about 80 degrees to about 10 degrees, or about 60 degrees to 30 degrees, or less than about, equal to about, or greater than about, 15 degrees, 20, 25, 30, 35, 40, 45, 50, 55, 60, 65, 70, or 75 degrees.

As illustrated, the local minimum cross-sectional area is located at or near a mid-point of the axis 18 of the elongated body 12. The local minimum cross-sectional area of elongated body 12 is less than the first or second cross-sectional areas of first end 14 or second end 16 respectively. For example, the local minimum cross-sectional area can range from about 20 percent to about 40 percent less than either of the first or second cross-sectional areas, or from about 25 percent to about 35 percent less than either of the first or second cross-sectional areas, or less than about, equal to about, or greater than about 21 percent, 22, 23, 24, 25, 26, 27, 28, 29, 30, 31, 32, 33, 34, 35, 36, 37, 38, or 39 percent less than either of the first or second cross-sectional areas.

Although elongated body 12 has a varying cross-sectional area, elongated body 12 can have different cross-sectional shapes. For example, elongated body 12 can have a circular cross-sectional shape or a polygonal cross-sectional shape. The cross-sectional shape can be variable or constant between first end 14 and second end 16. FIG. 1 shows elongated body 12 having a trapezoidal constant cross-sectional shape of varying cross-sectional area. As illustrated, elongated body 12 is formed from four faces, each of which extends between first end 14 and second end 16. More specifically, elongated body 12 includes first face 22, second face 24, third face 26, fourth face 28, first edge 30, second edge 32, third edge 34, and fourth edge 36. First face 22 is wider than second face 24, third face 26, and fourth face 28, while second face 24 and third face 26 are wider than fourth face 28. First edge 30 is formed between first face 22 and second face 24. Second edge 32 is formed between second face 24 and third face 26. Third edge 34 is formed between third face 26 and fourth face 28. Fourth edge 36 is formed between fourth face 28 and first face 22. As illustrated in FIG. 1, first face 22 is tapered towards the local minimum cross sectional area. However, any other face or edge can be tapered instead of, or in addition to, first face 22. First face 22 is illustrated to have a linear taper but can also have a curved taper.

An angle between at least two of the first face 22, second face 24, third face 26, or fourth face 28 can be less than or greater than 90 degrees. As illustrated for example, an angle between first face 22 and each of second face 24 and fourth face 28 is less than 90 degrees. This gives abrasive particle 10A an overall wedge shaped profile when viewed from first face 22 to fourth face 28.

Figure 2:
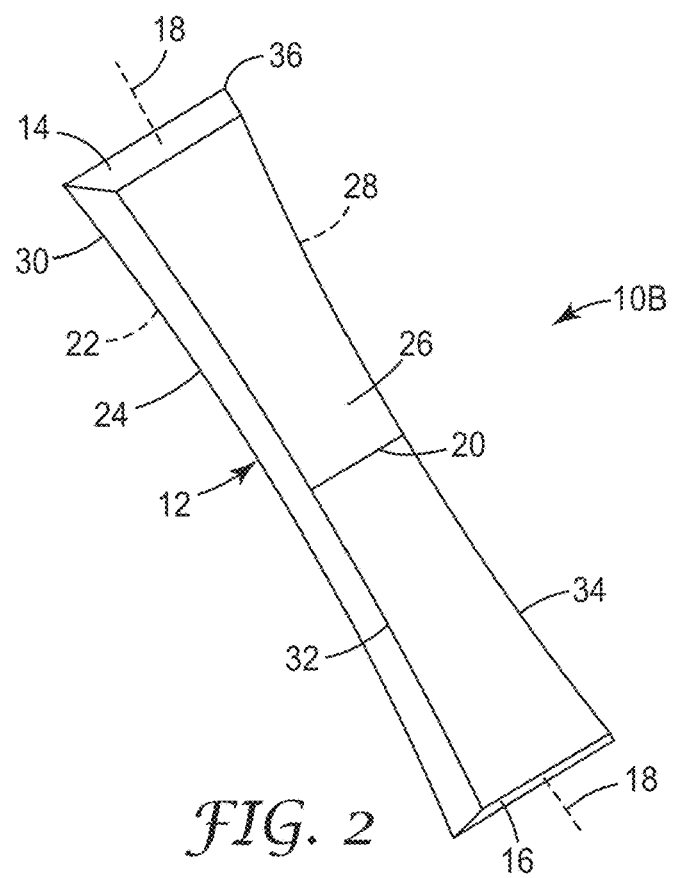
FIG. 2 is a perspective view of another embodiment of the abrasive particle having a trapezoidal constant cross-sectional shape and multiple tapered faces.

FIG. 2 is a perspective view of another embodiment of abrasive particle 10. As illustrated, abrasive particle 10B has three faces tapering towards inflection point 20. Specifically, second face 24, third face 26, and fourth face 28 taper towards intersection. Each of second face 24, third face 26 and fourth face 28 has a curved taper profile, which tapers towards inflection point 20.

Figure 3:
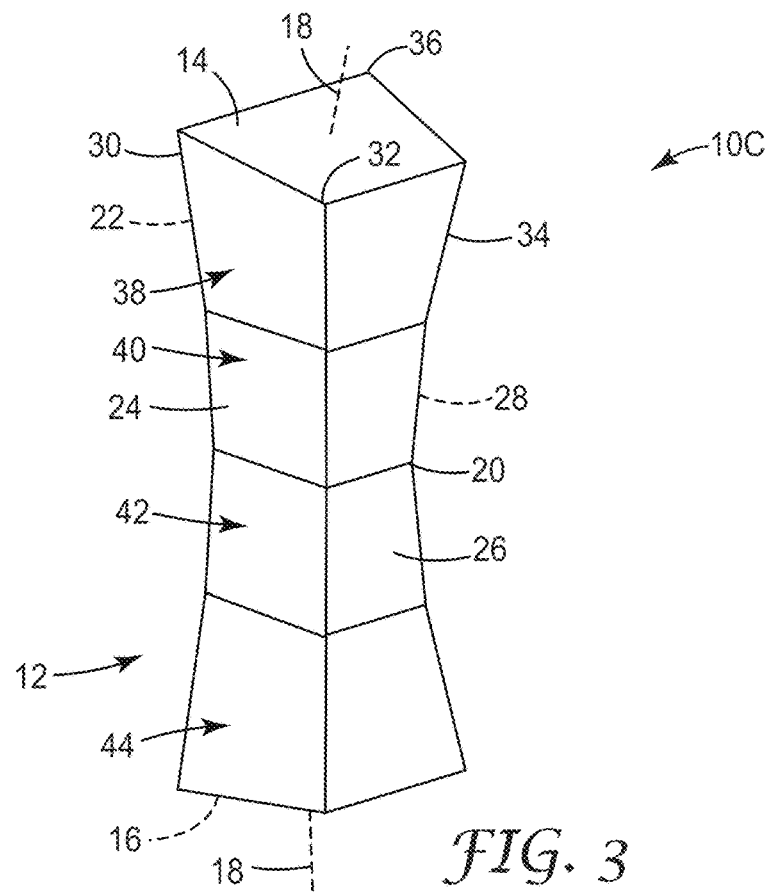
FIG. 3 is a perspective view of another embodiment of the abrasive particle having a trapezoidal constant cross-sectional shape formed from a number of facets.

FIG. 3 is a perspective view of abrasive particle 10C, which includes first facet 38, second facet 40, third facet 42, and fourth facet 44. Each facet 38-44 forms a portion of the tapered profile of abrasive particle 10C. First facet 38 and fourth facet 44 are non-parallel with respect to each other but are oriented at the same angle with respect to axis 18. Second facet 40 and third facet 42 are non-parallel with respect to each other but are oriented at the same angle with respect to axis 18. The angle at which first facet 38 and fourth facet 44 are oriented differs from the angle at which second facet 40 and third facet 42 are oriented.

Figure 4:
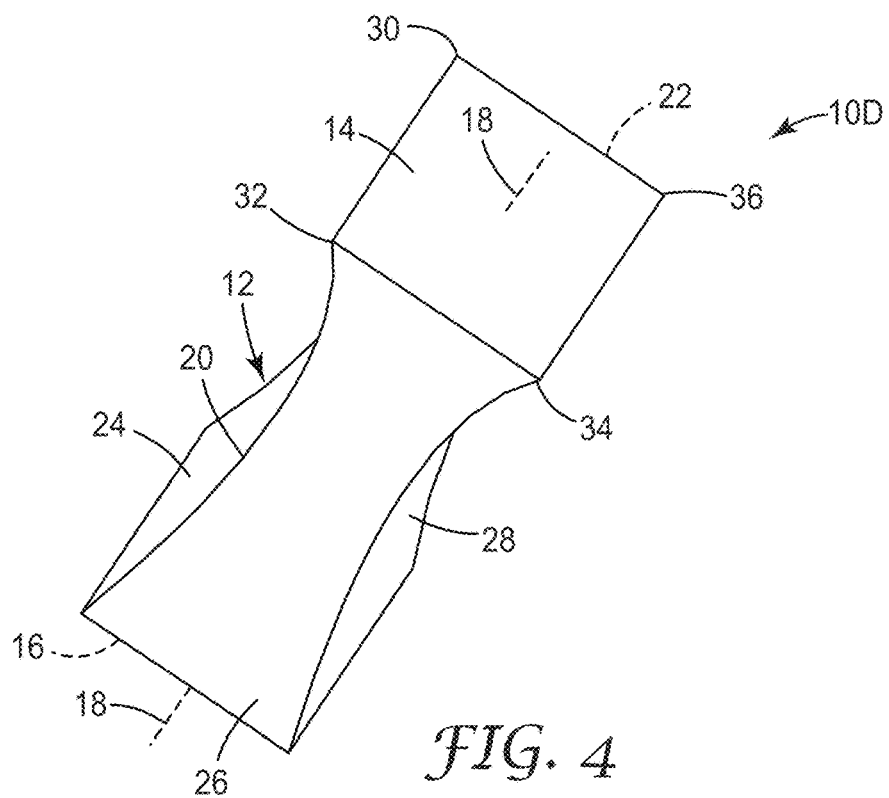
FIG. 4 is a perspective view of another abrasive particle having a square constant cross-sectional shape and multiple curved concave faces.

FIG. 4 is a perspective view of abrasive particle 10D. As illustrated, elongated body 12 has a constant square cross-sectional shape of varying cross-sectional area. In other embodiments, the square cross-sectional shape may not be constant. As illustrated, first face 22 and second face 24 are parallel to each other. In other embodiments, first face 22 and second face 24 can be non-parallel to each other as described herein with respect to other examples of abrasive particle 10. As illustrated, each of first face 22, second face 24, third face 26, and fourth face 28 is tapered in a curved manner having a concave profile to inflection point 20. In other embodiments, as few as one of first face 22, second face 24, third face 26, and fourth face 28 can be tapered. Additionally, axis 18 is straight but can also be non-orthogonal in further embodiments.

Figure 5:
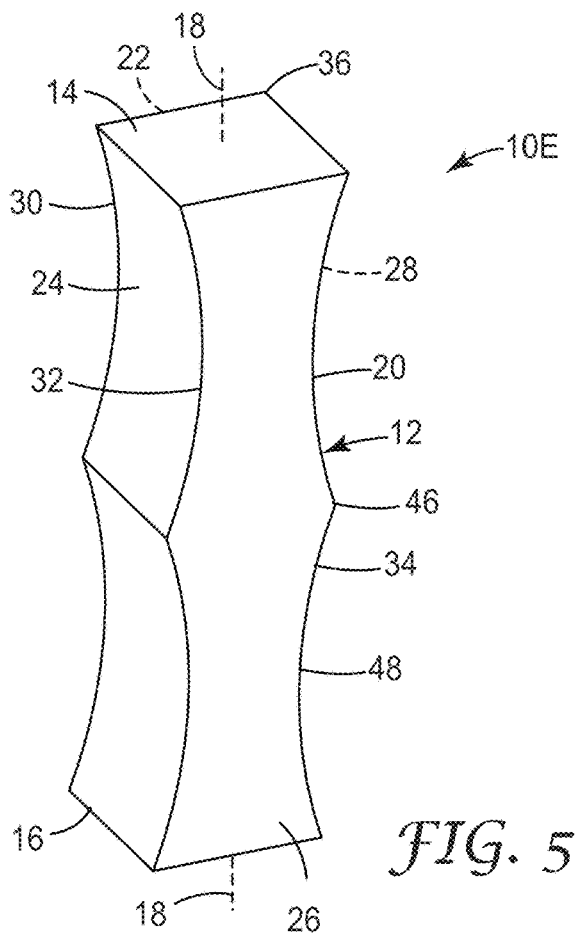
FIG. 5 is a perspective view of another abrasive particle having a square constant cross-sectional shape and multiple curved concave faces having two local minimum cross-sectional areas located between the ends of the abrasive particle.

FIG. 5 is a perspective view of abrasive particle 10E. As illustrated, second face 24 and fourth face 28 are tapered in a curved manner and include first inflection point 20, second inflection point 46, and third inflection point 48. The cross-sectional areas at first inflection point 20 and third inflection point 48 represent respective first and second local minimum cross-sectional areas of elongated body 12. As illustrated, the first and second local minimum cross-sectional areas have the about same area. In other examples, however, the first and second local minimum cross-sectional areas can have different areas.

The cross-sectional area between the first and second local minimum cross-sectional areas, at second inflection point 46, in contrast, represents a local maximum cross-sectional area. As illustrated, the local maximum cross-sectional area is substantially the same as both of the first and second cross-sectional areas of first end 14 and second end 16. In other embodiments in which the cross-sectional areas of first end 14 and second end 16 are different, the local maximum cross-sectional area at second inflection point 46 can be as large as the larger area of either first end 14 or second end 16. Typically, the local maximum cross-sectional area at third inflection point 48 is not larger than either the first cross-sectional area or the second cross-sectional area. As illustrated, the local maximum cross-sectional area is located substantially at the mid-point of axis 18 of elongated body 12. In additional embodiments, the local maximum cross-sectional area is located between a mid-point of axis 18 of elongated body 12 and one of first end 14 or second end 16.

As illustrated, first face 22 and fourth face 28 are not tapered, although either face can be tapered in additional examples. Additionally, as few as one of first face 22, second face 24, third face 26, and fourth face 28 can be tapered in further examples.

Figure 6:
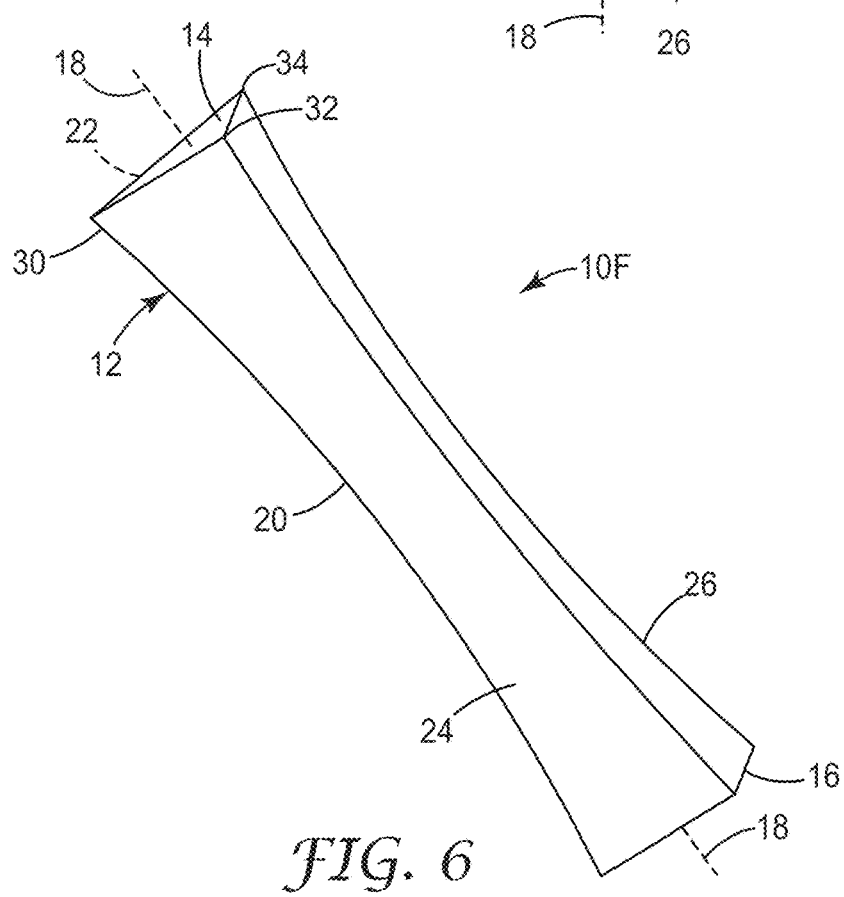
FIG. 6 is a perspective view of another embodiment of the abrasive particle having a triangular constant cross-sectional shape and multiple curved faces.

FIG. 6 is a perspective view of abrasive particle 10F. As illustrated, elongated body 12 has a constant triangular cross-sectional shape of varying cross-sectional area. The local minimum cross-sectional area of elongated body 12 is located at inflection point 20. As illustrated, an angle between each of first face 22, second face 24, and third face 26 is substantially 120 degrees. Thus, the constant cross-sectional shape represents an equilateral triangle. In other embodiments, the cross-sectional shape can represent a scalene or isosceles triangle, depending on the angles between each of first face 22, second face 24, and third face 26.

As illustrated, first end 14 and second end 16 are oriented at an angle relative to axis 18 that is less than 90 degrees and are non-parallel with respect to each other. In other examples, only one of the first and second ends are oriented at an angle relative to the axis 18 that is less than 90 degrees. Additionally, second face 24 and third face 26 are illustrated as tapered. In other examples first face 22 can also be tapered or only one of first face 22, second face 24, or third face 26 can be tapered. Additionally, axis 18 is illustrated as having a non-orthogonal profile but in other examples axis 18 can be straight.

Figure 7:
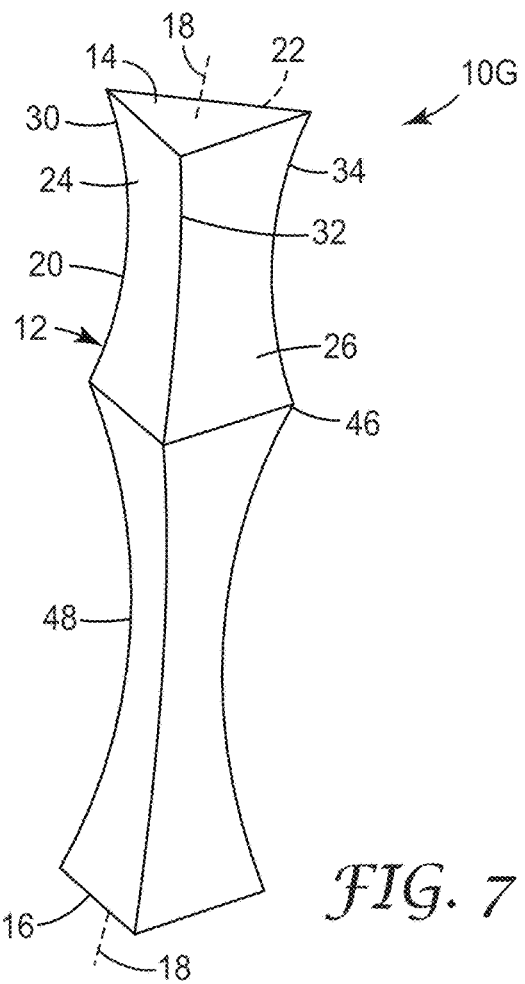
FIG. 7 is a perspective view of another abrasive particle having a triangular constant cross-sectional shape and multiple curved faces having two local minimum cross-sectional areas located between the ends of the abrasive particle.

FIG. 7 shows abrasive particle 10G. As illustrated, second face 24 and third face 26 are tapered and include first inflection point 20, second inflection point 46, and third inflection point 48. The cross-sectional areas at first inflection point 20 and third inflection point 48 represent respective first and second local minimum cross-sectional areas of elongated body 12. As illustrated, the first and second local minimum cross-sectional areas have different areas. In other examples, however, the first and second local minimum cross-sectional areas can have the about same area.

The cross-sectional area at second inflection point 46, in contrast, represents a local maximum cross-sectional area. As illustrated, the local maximum cross-sectional area is substantially the same as both of the first and second cross-sectional areas of first end 14 and second end 16. In other embodiments in which the cross-sectional areas of first end 14 and second end 16 are different, the local maximum cross-sectional area at second inflection point 46 can be as large as the larger area of first end 14 or second end 16. Typically, the local maximum cross-sectional area at third inflection point 48 is not larger than either the first cross-sectional area or the second cross-sectional area. As illustrated, the local maximum cross-sectional area is located substantially at the mid-point of axis 18 of elongated body 12. In additional embodiments, the local maximum cross-sectional area is located between the mid-point of axis 18 of elongated body 12 and one of first end 14 or second end 16.

As illustrated, first face 22 is not tapered, although it can be tapered in additional examples. Additionally, only one of first face 22, second face 24, or third face 26 can be tapered in further examples.

Figure 8:
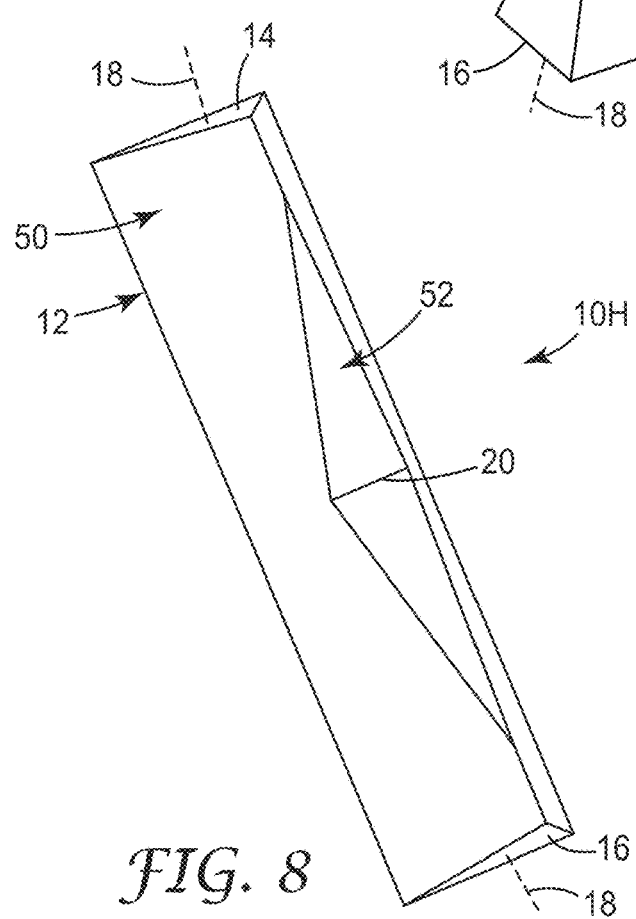
FIG. 8 is a perspective view of another embodiment of the abrasive particle having a first triangular constant cross-sectional shape portion and a second quadrilateral constant cross-sectional shape portion.
Figure 9:
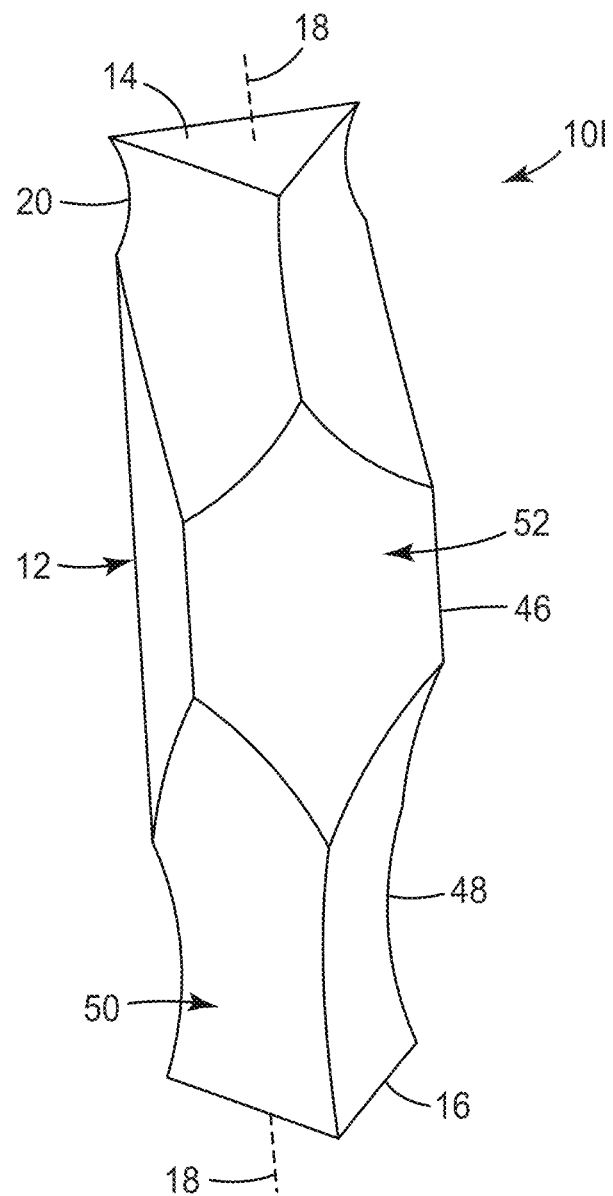
FIG. 9 is a perspective view of another embodiment of the abrasive particle having a first triangular constant cross-sectional shape portion and a second square constant cross-sectional shape and having two local minimum cross-sectional areas located between the ends of the abrasive particle.

FIG. 8 illustrates abrasive particle 10H. FIG. 9 illustrates abrasive particle 10I. As illustrated in both FIGS. 8 and 9, elongated body 12 includes first portion 50 and second portion 52. First portion 50 has a first constant cross-sectional shape of varying cross-sectional area. Second portion 52 has a second constant cross-sectional shape of varying cross-sectional area. As illustrated, the second cross-sectional shape is different than the first constant cross-sectional shape. Specifically, the first cross-sectional shape is triangular whereas the second cross-sectional shape is quadrilateral. In other examples, the constant cross-sectional shape of the first portion 50 and second portion 52 can be independently chosen from a circular cross sectional shape, a triangular cross-sectional shape, a square cross-sectional shape, a rectangular cross-sectional shape, and a trapezoidal cross-sectional shape.

As illustrated in FIGS. 8 and 9, first portion 50 forms less than fifty percent of the length of elongated body 12 along axis 18 while second portion 52 forms greater than fifty percent of the length of elongated body 12 along axis 18. In other examples first portion 50 can form greater than fifty percent of the length of elongated body 12 along axis 18 while second portion 52 forms less than fifty percent of the length of elongated body 12 along axis 18. In still further examples, each of first portion 50 and second portion 52 can form fifty percent of the length of elongated body 12 along axis 18.

While certain features of abrasive particle 10 have been described with respect to various embodiments, it is understood that any feature of one example can be included in any other example without departing from the scope of this disclosure. For example, in certain examples of abrasive particle 10, the tapering of elongated body 12 is linear. However, this can be altered such that the tapering of elongated body 12 can have a curved profile. In other examples, abrasive particles in which one face is tapered can be modified such that additional faces are tapered.

Numerous features of abrasive particle 10 provide certain benefits over corresponding abrasive particles that do not include those features. For example, the local minimum cross-sectional area(s) of abrasive particle 10 can help anchor abrasive particle 10 within a bonding matrix (e.g., make coat and bond coat) of an abrasive article. That is, as the bonding matrix interacts with abrasive particle 10, first end 14 and second end 16 can help to substantially retain abrasive particle 10 within the bonding matrix. This is due to the variable cross-sectional area of elongated body 12, which results in first end 14 and second end 16 having a larger cross-sectional surface area than a local minimum cross-sectional area of elongated body 12. With this configuration, either first end 14 or second end 16 are flared and are substantially embedded in the bonding matrix. Abrasive particles that do not include the varying cross-sectional area as abrasive particles 10 will not be so secured. For example, abrasive particles that do not have a variable cross-sectional area have no tapering and thus no flared portion to secure the particle within the bonding matrix.

Additionally, if an abrasive particle has an elongated body with a varying cross-sectional area, but the local minimum cross-sectional area of the elongated body is not located between two ends each having a larger cross-sectional surface area, the abrasive particle may not be as secure in the bonding matrix as abrasive particle 10. An example of such an abrasive particle could be one having a pyramidal shape. If a force was applied to the abrasive particle in a direction from the base to the vertex, the particle would be reasonably well secured in the bonding matrix. However, if the force was applied in a direction from the vertex to the base, the abrasive particle would come out of the bonding matrix relatively easily.

Another benefit of abrasive particle 10 is that the wedge shape resulting from at least first face 22 and second face 24 being disposed at an angle relative to axis 18 that is less than 90 degrees is that abrasive particle 10 can be easily removed from a mold. Additionally, the angle of first face 22 and second face 24 gives each face 22, 24 a cutting feature that is not present in abrasive particles where the first face and second face are disposed at a 90 degree angle with respect to an axis. Other features of abrasive particle 10 can facilitate removal from a mold as well. For example, if axis 18 has a non-orthogonal profile or if an angle between first face 22 and each of second face 24 and fourth face 28 is less than 90 degrees, then abrasive particle 10 can be removed from a mold more easily than a corresponding abrasive particle where each wall is disposed at an equivalent angle with respect to each other.

Abrasive particle 10 may be manufactured in a wide range of particle lengths depending on the size of a mold cavity. Typically the abrasive particle 10 ranges in size from about 0.1 to about 5000 micrometers, about 1 to about 2000 micrometers, about 5 to about 1500 micrometers, or in some embodiments, from about 50 to about 1000, or from about 100 to about 1000 micrometers.

Abrasive particle 10 made according to the present disclosure can be incorporated into an abrasive article, or used in loose form. Abrasive particles are generally graded to a given particle size distribution before use. Such distributions can have a range of particle sizes, from coarse particles to fine particles. In the abrasive art, this range is sometimes referred to as a "coarse", "control", and "fine" fractions. Abrasive particles graded according to abrasive industry-accepted grading standards specify the particle size distribution for each nominal grade within numerical limits. Such industry-accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, abrasive particle 10 can be graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20, meaning that the abrasive particles 10 pass through a test sieve meeting ASTM E-11 specifications for the number 18 sieve and are retained on a test sieve meeting ASTM E-11 specifications for the number 20 sieve. In one embodiment, the abrasive particles 10 have a particle size such that most of the abrasive particles 10 pass through an 18 mesh test sieve and can be retained on a 20, 25, 30, 35, 40, 45, or 50 mesh test sieve. In various embodiments of the invention, the abrasive particle 10 can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of abrasive particles having an abrasives industry specified nominal grade or nominal screened grade, wherein at least a portion of the plurality of abrasive particles are abrasive particle 10. In another aspect, the disclosure provides a method comprising grading the abrasive particle 10 made according to the present disclosure to provide a plurality of abrasive particles 10 having an abrasives industry specified nominal grade or a nominal screened grade.

If desired, abrasive particle 10 having an abrasives industry specified nominal grade or a nominal screened grade can be mixed with other known abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are abrasive particle 10 made according to the present disclosure, based on the total weight of the plurality of abrasive particles.

Method of Making Abrasive Particles

The method can include providing either a seeded or un-seeded abrasive dispersion containing particles that can be converted into alpha alumina. The particles are dispersed in a liquid that comprises a volatile component. In one embodiment, the volatile component is water. The abrasive dispersion should comprise an amount of liquid sufficient for the viscosity of the abrasive dispersion to be sufficiently low to enable filling the mold cavities and replicating the mold surfaces, but not so much liquid as to cause subsequent removal of the liquid from the mold cavity to be prohibitively expensive. The abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight of solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc., or "HiQ-40", available from BASF Corporation. These aluminum oxide monohydrates are relatively pure, i.e., they include relatively little, if any, hydrate phases other than monohydrates, and have a high surface area. The physical properties of the resulting abrasive particles will generally depend upon the type of material used in the abrasive dispersion.

In one embodiment, the abrasive dispersion is in a gel state. As used herein, a "gel" is a three-dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, which can be water soluble salts. They can include a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. The introduction of a modifying additive or precursor of a modifying additive can cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Suitable nucleating agents include fine particles of alpha alumina, alpha ferric oxide or its precursor, titanium oxides and titanates, chrome oxides, or any other material that will nucleate the transformation. The amount of nucleating agent, if used, should be sufficient to effect the transformation to alpha alumina.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used, but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be created or formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

Figure 10A:
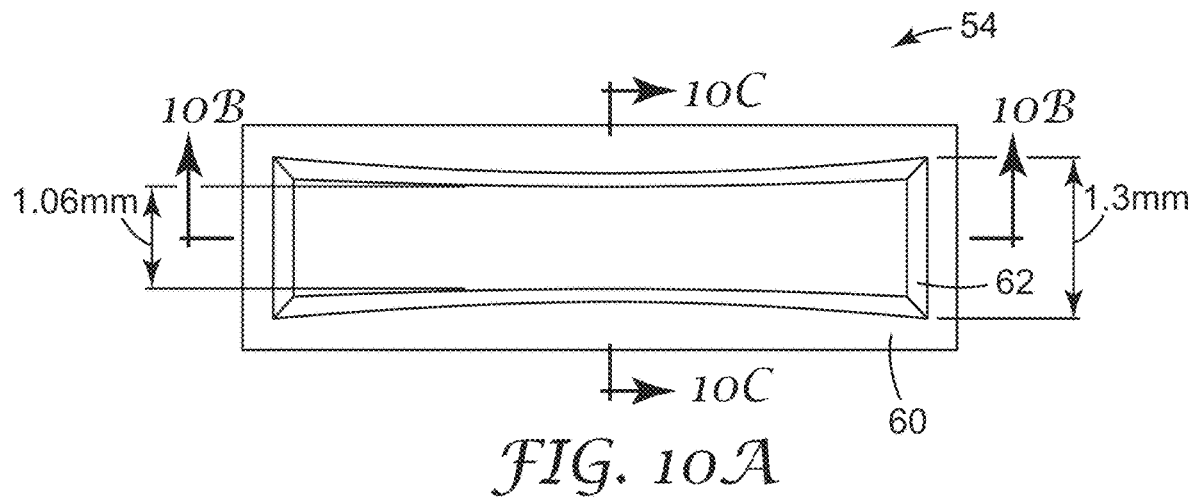
FIG. 10A is a schematic top view of a representative mold cavity in mold used to make particles AP1.
Figure 10B:
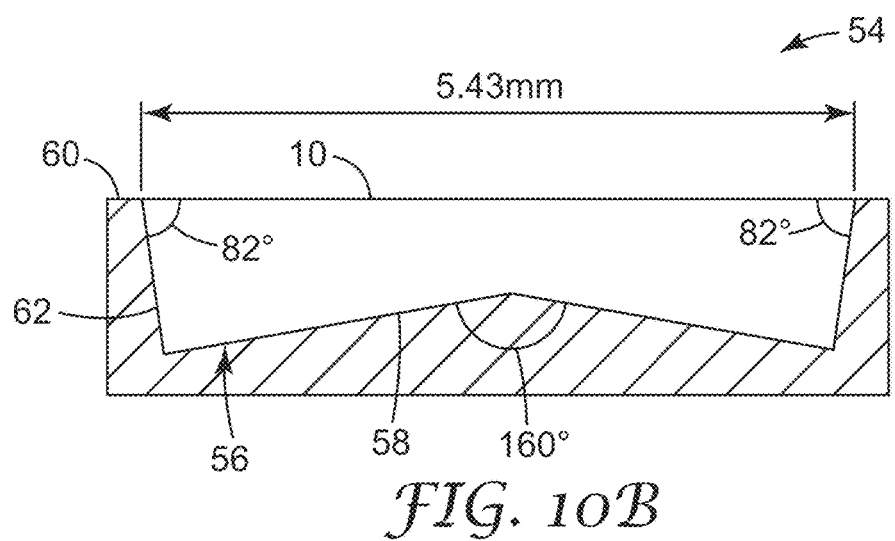
FIG. 10B is a schematic cross-sectional side view of mold cavity taken along line 10B-10B in FIG. 10A.
Figure 10C:
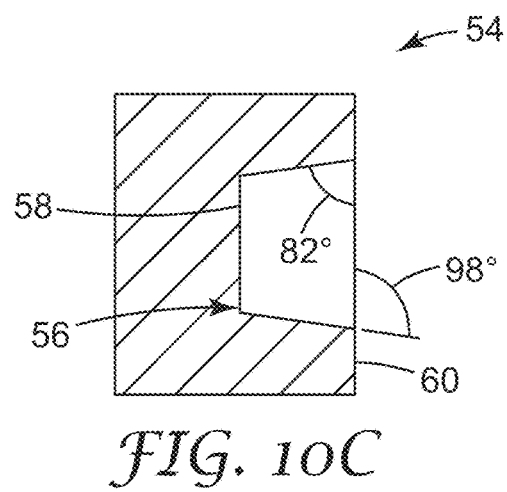
FIG. 10C is a schematic cross-sectional view of mold cavity taken along line 10C-10C in FIG. 10A.

Referring to FIGS. 10A-10C, the method may include providing a mold 54 having at least one cavity 56, or a plurality of cavities. Cavity 56 as shown can be used to produce abrasive particle 10. Mold 54 has a generally sloped bottom surface 58. Cavity 56 can be formed in a production tool. The production tool can be a belt, a sheet, a continuous web, a coating roll such as a rotogravure roll, a sleeve mounted on a coating roll, or a die. The production tool can be composed of metal, (e.g., nickel), metal alloys, or plastic. The metal production tool can be fabricated by any conventional technique such as, for example, engraving, bobbing, electroforming, or diamond turning. The production tool can comprise polymeric material. In one embodiment, the entire tooling is made from a polymeric or thermoplastic material. In another embodiment, the surfaces of the tooling in contact with the sol-gel while drying, such as the surfaces of the plurality of cavities (mold bottom surface and mold sidewall) are formed from polymeric or thermoplastic materials; other portions of the tooling can be made from other materials. A suitable polymeric coating may be applied to a metal tooling to change its surface tension properties, by way of example.

A polymeric tool can be replicated off a metal master tool. The master tool will have the inverse pattern desired for the production tool. The master tool can be made in the same manner as the production tool. In one embodiment, the master tool is made out of metal, e.g., nickel, and is diamond turned. The polymeric sheet material can be heated along with the master tool such that the polymeric material is embossed with the master tool pattern by pressing the two together. The polymeric material can also be extruded or cast onto the master tool and then pressed. The polymeric material is cooled to solidify and produce the production tool. Examples of polymeric production tool materials include thermoplastics such as polyester, polycarbonates, polyvinyl chloride, polypropylene, polyethylene and combinations thereof, as well as thermosetting materials. If a thermoplastic production tool is utilized, then care should be taken not to generate excessive heat that may distort the thermoplastic production tool, limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavity 56 can be from an opening in top surface 60. In some instances, cavity 56 can extend for the entire thickness of mold 54. Alternatively, cavity 56 can extend only for a portion of the thickness of mold 54. In one embodiment, top surface 60 is substantially parallel to bottom surface 58 of mold 54 with the cavities having a substantially uniform depth. At least one side of mold 54, i.e., the side in which cavity 56 is formed, can remain exposed to the surrounding atmosphere during the step in which the volatile component is removed. This open side corresponds to first face 22 of abrasive particle 10.

Cavity 56 has a specified three-dimensional shape that is the negative impression of whichever abrasive particle 10 is formed therein. In one embodiment, the shape of a cavity 56 can be described as being a triangle, as viewed from the top, having sloping sidewall 62 such that bottom surface 58 of cavity 56 is slightly smaller than the opening in top surface 60. A sloping sidewall is believed to enable easier removal of the precursor abrasive particles from the mold. In various embodiments of the disclosure, sloping sidewall 62 can have an angle that can range between about 91 degrees to about 120 degrees, or between about 95 degrees to about 100 degrees, such as 98 degrees. In other embodiments, the angle can range between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

Alternatively, other cavity shapes can be used, such as circles, rectangles, squares, hexagons, stars, or combinations thereof, all having a substantially uniform depth dimension. The depth dimension is equal to the perpendicular distance from top surface 60 to the lowermost point on bottom surface 58. In addition, a cavity can have the inverse of other geometric shapes, such as, for example, pyramidal, frusto-pyramidal, truncated spherical, truncated spheroidal, conical, and frusto-conical. The depth of a given cavity can be uniform or can vary along its length and/or width. The cavities of a given mold can be of the same shape or of different shapes.

The method can further include filling cavity 56 in mold 54 with the abrasive dispersion by any conventional technique. In some embodiments, a knife roll coater or vacuum slot die coater can be used. In one embodiment, top surface 60 of mold 54 is coated with the abrasive dispersion. The abrasive dispersion can be pumped onto top surface 60. Next, a scraper or leveler bar can be used to force the abrasive dispersion fully into cavity 56 of mold 54. The remaining portion of the abrasive dispersion that does not enter cavity 56 can be removed from top surface 60 of mold 54 and recycled. In some embodiments, a knife roll coater can be used. In some embodiments, a small portion of the abrasive dispersion can remain on top surface 60 and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond top surface 60 to ensure uniformity in thickness of the resulting abrasive particles.

In one embodiment, the internal surfaces of the cavity 56, including sidewall 62 and bottom surface 58, are free of mold release agents. Typical mold release agents include, for example, oils such as peanut oil, fish oil, or mineral oil, silicones, polytetrafluoroethylene, zinc stearate, and graphite. Absence of a mold release agent helps to ensure that the precursor abrasive particles will stick to the cavity walls as the abrasive dispersion is dried, thereby cracking at least the majority of the precursor abrasive particles in the mold.

The method can further include removing abrasive particles 10 from mold cavities 56. This step is made easier by shrinkage of the abrasive dispersion during formation of the precursor abrasive particles when the liquid is removed through evaporation. For example, it is not uncommon for the volume of the precursor abrasive particles to be 80 percent or less of that of the abrasive dispersion from which it was formed. The precursor abrasive particles can be removed from the cavities 56 by using the following processes alone or in combination on the mold: gravity, vibration, ultrasonic vibration, vacuum, or pressurized air to remove the particles from the mold.

The precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor abrasive particles will be dried from about 10 to about 480 minutes, or from about 120 to about 400 minutes, at a temperature from about 50° C. to about 160° C., or about 120° C. to about 150° C.

The method further includes calcining the precursor abrasive particles. During calcining, essentially all the volatile material is removed, and the various components that were present in the abrasive dispersion are transformed into metal oxides. The precursor abrasive particles are generally heated to a temperature of from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor abrasive particles. Then the precursor abrasive particles are prefired again.

The sixth process step involves sintering the calcined, precursor abrasive particles to form the abrasive particles 10. Prior to sintering, the calcined, precursor abrasive particles are not completely densified and thus lack the hardness to be used as abrasive particles. Sintering takes place by heating the calcined precursor abrasive particles to a temperature of from 1,000° C. to 1,650° C. and maintaining them within this temperature range until substantially all of the alpha alumina monohydrate (or equivalent) is converted to alpha alumina and the porosity is reduced to less than 15 percent by volume. The length of time to which the calcined, abrasive particles could be exposed to the sintering temperature to achieve this level of conversion depends upon various factors, but usually from five seconds to 48 hours is typical. In another embodiment, the duration for the sintering step ranges from one minute to 90 minutes. Once sintered, the calcined plurality of precursor abrasive particles are converted into a plurality of abrasive particles 10.

After sintering, the abrasive particles 10 can have a Vickers hardness of about 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser.

Abrasive Article

In another aspect, the present disclosure provides an abrasive article comprising a binder and a plurality of abrasive particles, wherein at least a portion of the abrasive particles are abrasive particle 10 made according to the present disclosure. Exemplary abrasive articles include coated abrasive articles, bonded abrasive articles (e.g., wheels), nonwoven abrasive articles, and abrasive brushes. Coated abrasive articles can comprise a backing having first and second, opposed major surfaces and wherein the binder (make coat) and the plurality of abrasive particles form an abrasive layer on at least a portion of the first major surface. In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are abrasive particle 10 made according to the present disclosure based on the total weight of the abrasive particles in the abrasive article.

Figure 11:
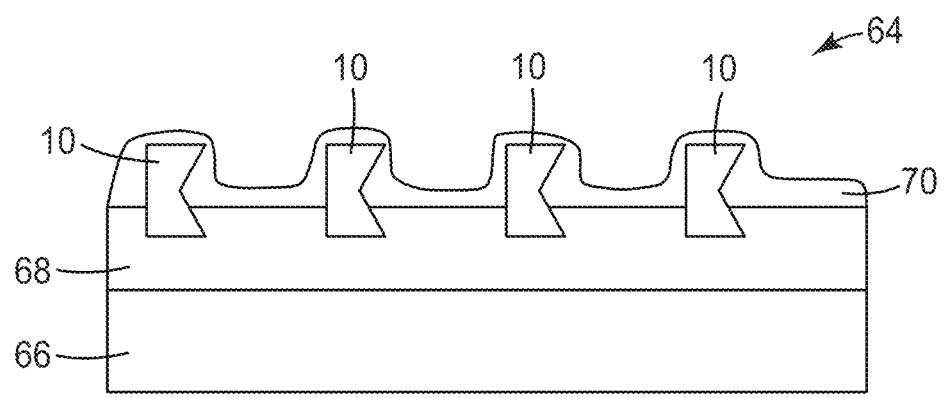
FIG. 11 is a schematic depiction of a coated abrasive article incorporating the abrasive particle.

As illustrated in FIG. 11, coated abrasive article 64 comprises backing 66 having first layer of make coat 68 (binder) applied over a first major surface of backing 66. Partially embedded in make coat 68 are a plurality of abrasive particles 10 forming an abrasive layer. Over abrasive particles 10 is a second layer of a size coat 70. The purpose of the make coat 68 is to secure abrasive particles 10 to backing 66, and the purpose of size coat 70 is to reinforce abrasive particles 10. As described herein, abrasive particles 10 are further secured to abrasive article 64 by make coat 68 and size coat 70 wrapping around flared first end 14 and second end 16 of abrasive particles 10. In some embodiments, at least 5, 10, 15, 20, 25, 30, 35, 40, 45, 50, 55, 60, 65, 70, 75, 80, 85, 90, 95, or even 100 percent by weight of abrasive particles in the abrasive layer are abrasive particle 10 made according to the present disclosure based on the total weight of the abrasive particles within the abrasive layer. In some embodiments, about 60 percent to 100 percent by weight of the abrasive particles in the abrasive layer are abrasive particle 10. In another embodiment, about 100 percent by weight of the abrasive particles in the abrasive layer are abrasive particle 10. In other embodiments the abrasive layer can include any mixture of abrasive particles 10A-10I.

During the manufacture of the coated abrasive article, abrasive particles 10 can be applied into the make coat by electrostatic coating techniques. Electrostatic coating causes the higher aspect ratio abrasive particle 10 to be oriented substantially vertically. This manner of orientation results in improved performance of the coated abrasive article.

The abrasive article may contain a blend of the abrasive particle 10 along with conventional abrasive grains, diluent grains, or erodible agglomerates. Representative examples of conventional abrasive grains include fused aluminum oxide, silicon carbide, garnet, fused alumina zirconia, cubic boron nitride, diamond, and the like. Representative examples of diluent grains include marble, gypsum, and glass.

Abrasive particle 10 may also have a surface coating. Surface coatings are known to improve the adhesion between abrasive grains and the binder in abrasive articles or can be used to aid in electrostatic deposition of the abrasive particles. Such surface coatings are described in U.S. Pat. Nos. 5,213,591; 5,011,508; 1,910,444; 3,041,156; 5,009,675; 5,085,671; 4,997,461 and 5,042,991. Additionally, the surface coating may prevent the abrasive particles from capping. Capping is the term to describe the phenomenon where metal particles from the workpiece being abraded become welded to the tops of the abrasive particles. Surface coatings to perform the above functions are known to those of skill in the art.

Make coat 68 and size coat 70 comprise a resinous adhesive. The resinous adhesive of make coat 68 can be the same as or different from that of size coat 70. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof.

In addition to the resinous adhesive, make coat 68 or size coat 70, or both coats, may further comprise additives that are known in the art, such as, for example, fillers, grinding aids, wetting agents, surfactants, dyes, pigments, coupling agents, and combinations thereof. Examples of fillers include calcium carbonate, silica, talc, clay, calcium metasilicate, dolomite, aluminum sulfate and combinations thereof. Grinding aids encompass a wide variety of different materials and can be inorganic or organic. Examples of grinding aids include waxes, organic halide compounds, halide salts, and metals and their alloys. The organic halide compounds can break down during abrading and release a halogen acid or a gaseous halide compound. It is also within the scope of this disclosure to utilize a supersize coating. The supersize coating can contains a binder and a grinding aid. The binders can be formed from such materials as phenolic resins, acrylate resins, epoxy resins, urea-formaldehyde resins, melamine resins, urethane resins, and combinations thereof.

Figure 12:
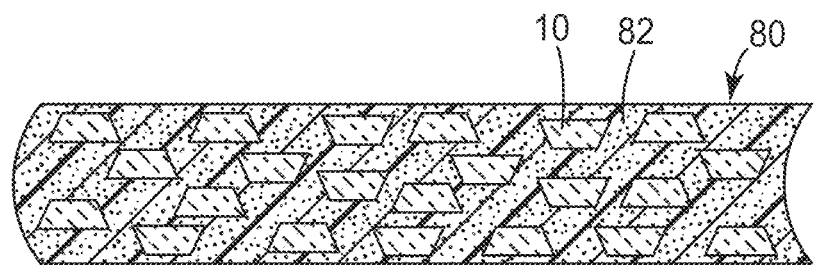
FIG. 12 is a sectional view of a bonded abrasive article incorporating the abrasive particle.

FIG. 12 illustrates bonded abrasive article 80. Bonded abrasive article 80 includes abrasive particles 10 embedded in binder material 82. As illustrated, bonded abrasive article 80 is part of a wheel. Bonded abrasive article 80 is generally made by a molding process. During molding, a binder material precursor, either liquid organic, powdered inorganic, powdered organic, or a combination of thereof, is mixed with the abrasive particles. In some instances, a liquid medium (e.g., either resin or a solvent) is first applied to the abrasive particles to wet their outer surface, and then the wetted particles are mixed with a powdered medium. Bonded abrasive wheels according to the present disclosure may be made by compression molding, injection molding, transfer molding, or the like. The molding can be done either by hot or cold pressing or any suitable manner known to those skilled in the art.

The binder material can include a glassy inorganic material (e.g., as in the case of vitrified abrasive wheels), metal, or an organic resin (e.g., as in the case of resin-bonded abrasive wheels).

EXAMPLES

Various embodiments of the present disclosure can be better understood by reference to the following Examples which are offered by way of illustration. The present disclosure is not limited to the Examples given herein.

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Unless stated otherwise, all other reagents were obtained, or are available from fine chemical vendors such as Sigma-Aldrich Company, St. Louis, Mo., or may be synthesized by known methods.

Material abbreviations used in the Examples are described in Table 1, below.

TABLE 1

| ABBRE-VIATION | DESCRIPTION |
|---|---|
| AP1 | Shaped abrasive particles prepared according to the procedure described in EXAMPLE 1. |
| AP2 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 1.4 mm (side length) × 0.35 mm (thickness), with a draft angle approximately 98 degrees. |
| AP3 | Cylindrical sintered rods obtained under trade designation "MORUNDUM SR-1" from Showa Denko Europe GmbH, Munchen, Germany. |
| AP4 | Fused Aluminum Oxide (24 mesh ANSI graded) under the trade name designation "ALODUR" obtained from Treibacher Schleifmittel GmbH, Villach, Austria. |

Grinding test. Abrasive wheels were tested by grinding a rectangular mild steel bar (0.25 inch (0.6 cm)×18 inches (45.7 cm)×3 inches (7.6 cm)) over a 0.25 inch (0.6 cm)×18 inches (45.7 cm) area of the surface while mounted on a 12000 rpm air driven grinder that oscillated back and forth (one cycle=18 inches (45.7 cm) each way for a total of 36 inches (91 cm)) for ten one-minute cycles. The applied load was the grinder weight of 9 pounds (4.1 kg) and the abrasive wheel was held at an angle of 15 degrees relative to the surface (i.e., 0 degrees). The steel bar was traversed 16 times from end to end per cycle. The steel bar was weighed before and after each cycle, and the weight loss (i.e., cut) was recorded. Total cut was measured as the cumulative mass loss in grams at the end of the test. Disc wear was measured as weight loss from the grinding disc (i.e.) recorded after the 10-cycle test.

Example 1

A sample of boehmite sol-gel was made using the following recipe: aluminum oxide monohydrate powder (1600 parts, obtained under the trade designation of "DISPERAL") was dispersed by high shear mixing a solution containing deionized water (2400 parts) and 70% aqueous nitric acid (72 parts). The resulting sol-gel was aged for 1 hour. The resulting sol-gel was forced into a mold having a topical coating of peanut oil obtained by brushing about 2 grams of a 1% by weight peanut oil solution in methanol onto the sheet. Views of the mold cavity are shown in FIGS. 10A-10C, where nominal dimensions and angles are indicated. The sol-gel was spread to the sheet using a putty knife so that the cavities were completely filled. The sheet containing the sol-gel was then air dried for two hours. Following drying, the sheet was shaken to dislodge the resulting precursor shaped particles.

Figure 13:
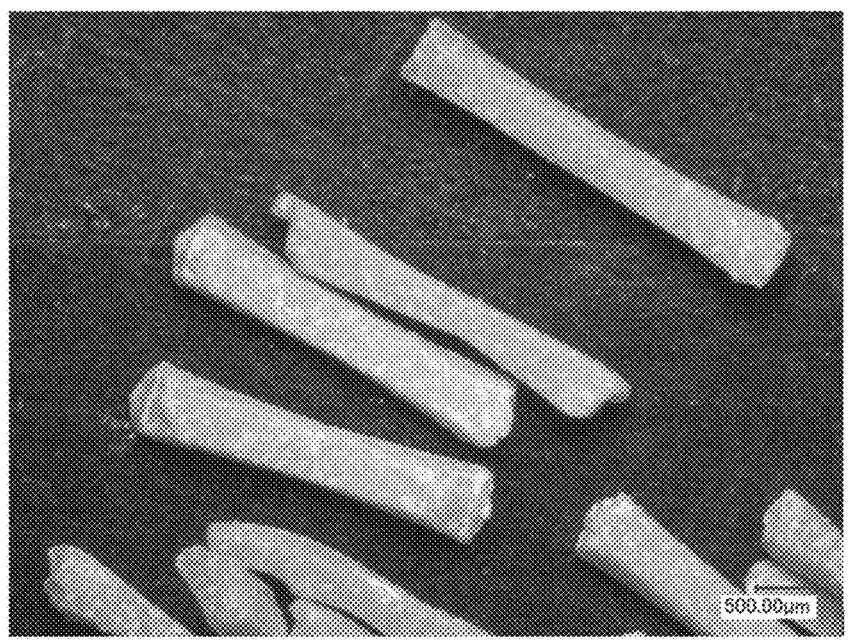
FIG. 13 is a photograph showing abrasive particles AP1.

The precursor shaped abrasive particles were then calcined by heating them to approximately 650° C. in air for 15 minutes. The particles were then saturated with a mixed nitrate solution of the following concentration (reported as oxides): 1.8% each of MgO, $Y_2O_3$, $Nd_2O_3$ and $La_2O_3$. The excess nitrate solution was removed and the saturated precursor shaped abrasive particles were allowed to dry after which the particles were again calcined at 650° C. and sintered at approximately 1400° C. Both the calcining and sintering was performed using rotary tube kilns. The typical abrasive particles AP1 produced by the above method are shown in FIG. 13.

Example 2

The abrasive particles AP1 were used to make depressed center grinding wheels. A Type 27 depressed-center composite grinding wheel was prepared as follows. A mixture was prepared by combining 860 grams abrasive particles AP1, 55 grams liquid phenolic resin (obtained under trade designation "PREFERE 825136G1" from Dynea Oy Corporation, Helsinki, Finland), 155 grams phenolic resin powder (obtained under trade designation "VARCUM 29302" from Durez Corporation, Dallas, Tex.) and 155 grams sodium hexafluoroaluminate (obtained under trade designation "CRYOLITE" from Freebee, Ullerslev, Denmark), and mixing for 10 minutes using a paddle-type mixer (obtained as "CUISINART SM-70" from Conair Corporation, East Windsor, N.J., operated at speed 1). A 4.5-inch (11.4 centimeters) diameter disc of fiberglass mesh scrim (obtained under the trade designation "PS 660" from Swatycomet D.O.O, Maribor, Slovenia) was placed into a 4.5-inch (11.4-centimeters) diameter cavity die. The mixture (150 grams) was spread out evenly. A second 4-inch (10.2 centimeters) diameter of fiberglass mesh scrim (obtained under the trade designation "PS 660" from Swatycomet D.O.O) was placed on top of the mixture. Then additional same mixture (150 grams) of was spread out evenly. A third 3-inch (7.4 centimeters) diameter of fiberglass mesh scrim (obtained under the trade designation "PS 660" from Swatycomet D.O.O) was placed on top of the mixture. The filled cavity mold was then pressed at a pressure of 40 tons/38 square inches (14.5 megapascals)

The resulting wheel was removed from the cavity mold and placed on a spindle between depressed center aluminum plates in order to be pressed into a Type 27 depressed-center grinding wheel. The wheel was compressed at 5 ton/38 square inches (1.8 megapascals) to shape the disc. The wheel was then placed in an oven to cure for 7 hours at 79° C., 3 hours at 107° C., 18 hours at 185° C., and a temperature ramp-down over 4 hours to 27° C. The dimensions of the final grinding wheel were 180 millimeter diameter×7 millimeter thickness. The center hole was ⅞ inch (2.2 centimeters) in diameter.

Comparative Example A

The procedure generally described in EXAMPLE 2 was repeated, with the exception that AP2 was used instead of AP1.

Comparative Example B

The procedure generally described in EXAMPLE 2 was repeated, with the exception that AP3 was used instead of AP1.

Figure 14:
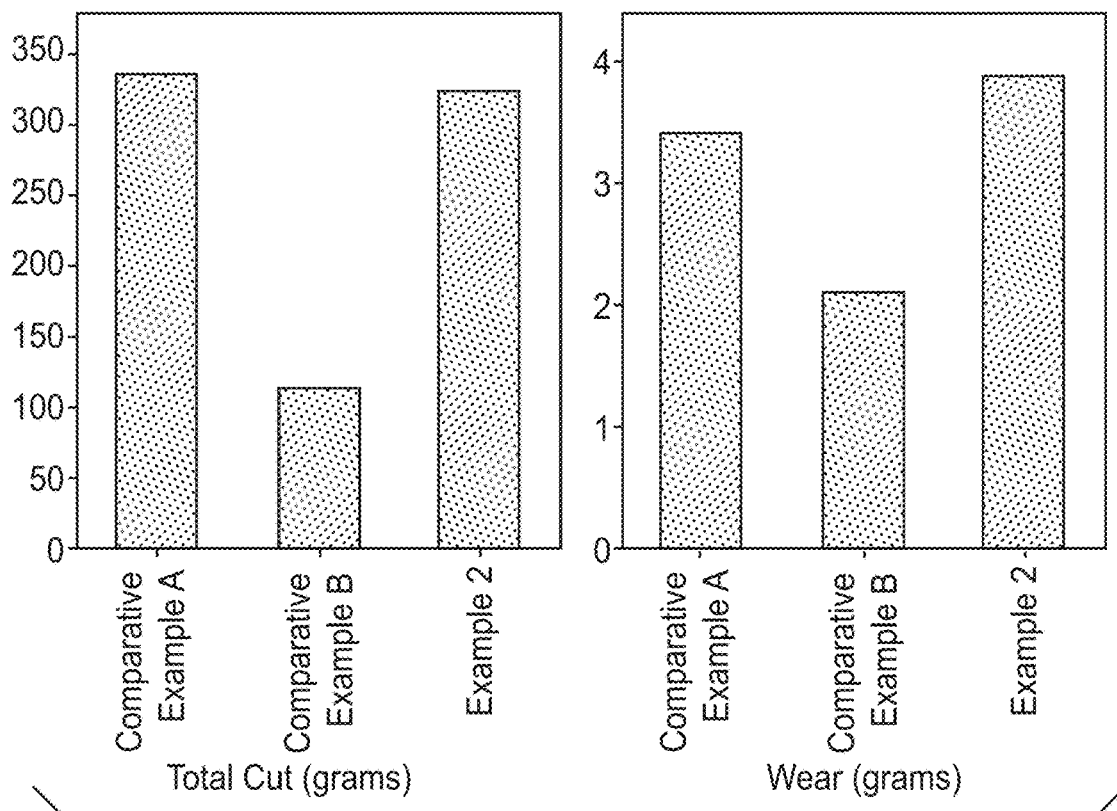
FIG. 14 is a graph showing grinding test results of Example 2 and Comparative Example A.

Abrasive wheels made from EXAMPLE 2, COMPARATIVE EXAMPLES A and B were tested using the method described in "Grinding Test". The test results were summarized in Table 1 and FIG. 14.

TABLE 1

|  | Total Cut (Grams) | Wear (Grams) |
| --- | --- | --- |
| EXAMPLE 2 | 326 | 3.91 |
| COMPARATIVE EXAMPLE A | 337 | 3.41 |
| COMPARATIVE EXAMPLE B | 114 | 2.09 |

Figure 15:
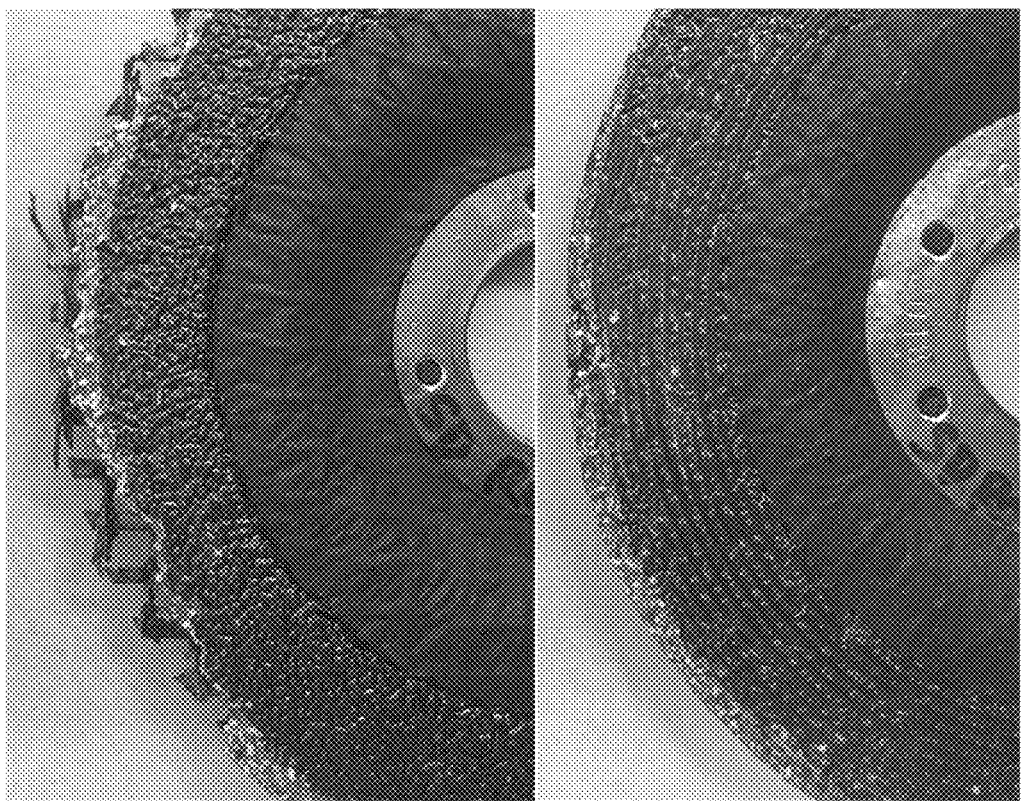
FIG. 15 is a photograph showing a wheel made from abrasive particles according to Comparative Example B.
Figure 16:
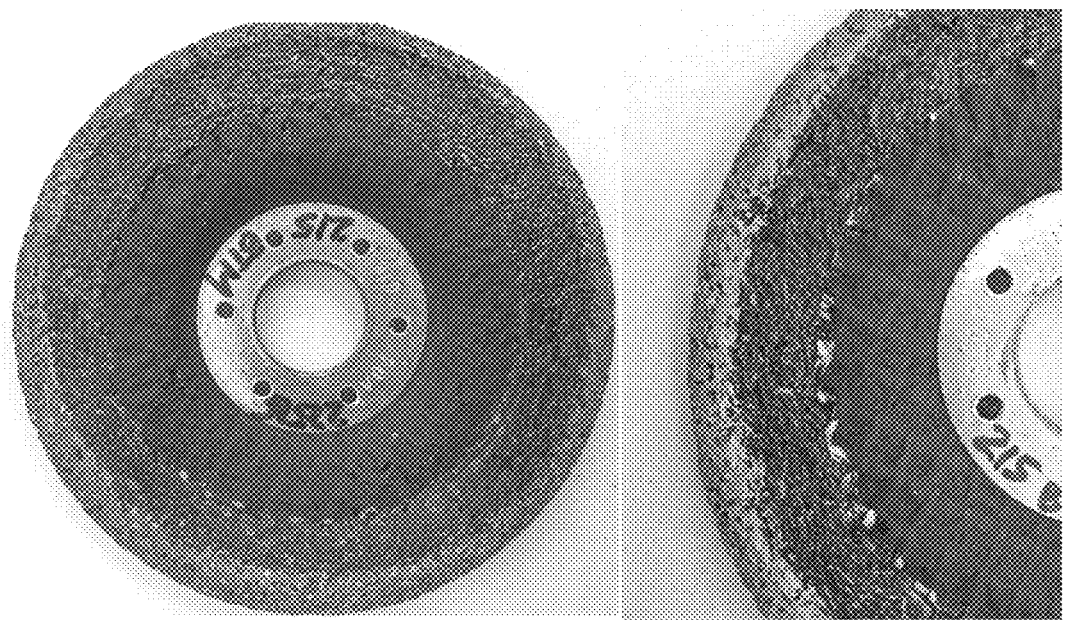
FIG. 16 is a photograph showing a wheel made from abrasive particles according to Example 2.

The wheels made from COMPARATIVE EXAMPLE B failed at the end of the grinding test and showed significant catastrophic wear (as shown in FIG. 15) compared to the wheel made from EXAMPLE 2 (wear shown in FIG. 16).

Example 3

The procedure generally described in EXAMPLE 2 was repeated, with the exception that AP1 was replaced with an abrasive particle blend consisting of 50 parts of AP1 and 50 parts of AP4 was used instead of 100 percent AP1.

Comparative Example C

The procedure generally described in EXAMPLE 2 was repeated, with the exception that AP1 was replaced with an abrasive particle blend consisting of 50 parts of AP2 and 50 parts of AP4.

Comparative Example D

The procedure generally described in EXAMPLE 2 was repeated, with the exception that AP1 was replaced with an abrasive particle blend consisting of 50 parts of AP3 and 50 parts of AP4.

Figure 17:
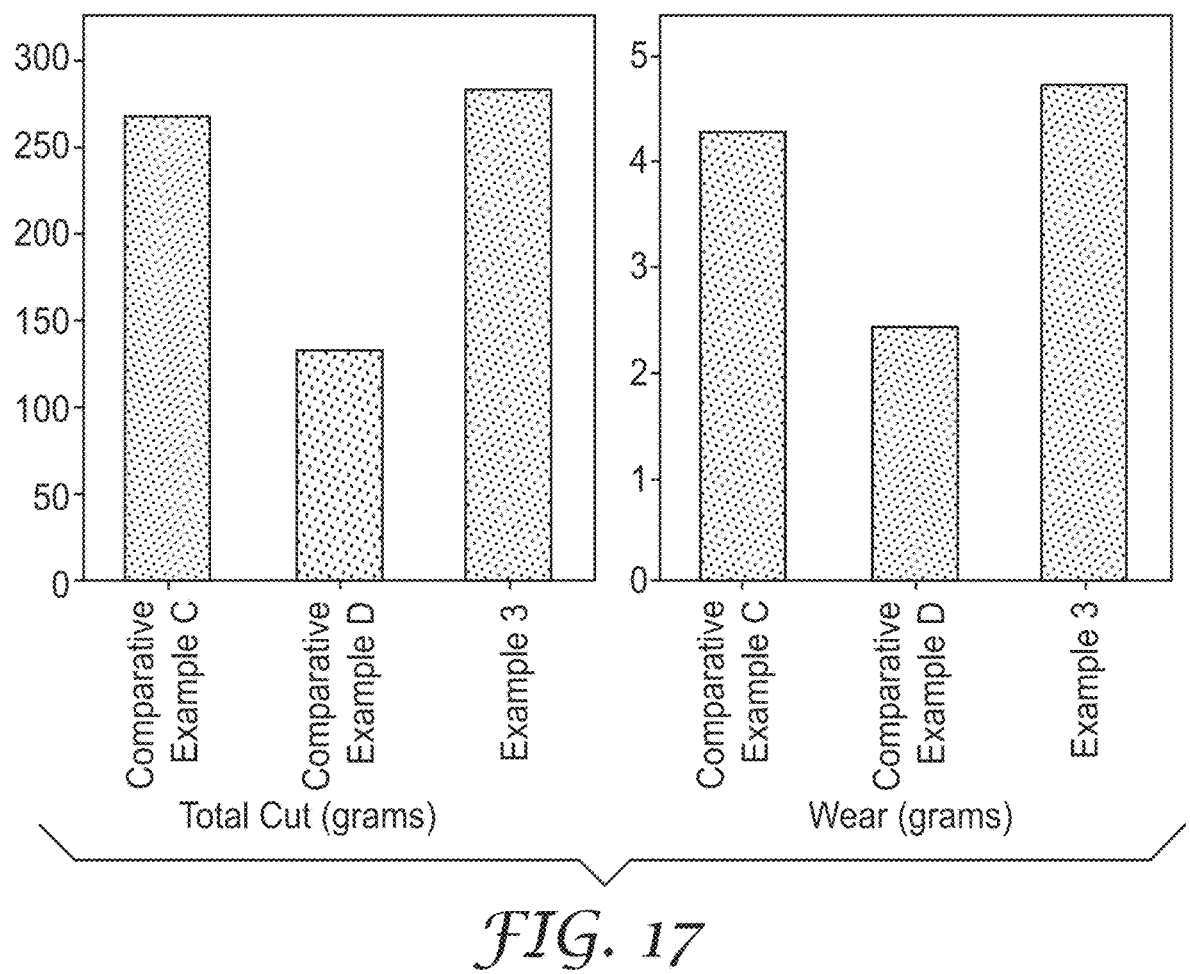
FIG. 17 is a graph showing grinding test results of Example 3 and Comparative Examples B.

Abrasive wheels made from EXAMPLE 3, COMPARATIVE EXAMPLES C and D were tested using the method described in "Grinding Test". The test results were summarized in Table 2 and FIG. 17.

TABLE 2

|  | Total Cut (Grams) | Wear (Grams) |
| --- | --- | --- |
| EXAMPLE 3 | 282 | 4.75 |
| COMPARATIVE EXAMPLE C | 265 | 4.30 |
| COMPARATIVE EXAMPLE D | 132 | 2.39 |

Various modifications and alterations of this disclosure may be made by those skilled in the art without departing from the scope and spirit of this disclosure, and it should be understood that this disclosure is not to be unduly limited to the illustrative embodiments set forth herein.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments Embodiment 1 provides an abrasive particle comprising:
an elongated body defined between opposed first and second ends each defining a substantially planar surface, wherein the elongated body has an axis extending through the first and second ends, the first and second ends have respective first and second cross-sectional areas, at least one of the first and second ends are oriented at an angle relative to the axis that is less than 90 degrees, the elongated body has a variable cross-sectional area centered along the axis, and at least one cross-sectional area between the first and second ends represents a local minimum cross-sectional area.

Embodiment 2 provides the abrasive particle according to Embodiment 1, wherein the axis is a non-orthogonal axis.

Embodiment 3 provides the abrasive particle according to any one of Embodiments 1-2, wherein both of the first and second ends are oriented at an angle relative to the axis that is less than 90 degrees.

Embodiment 4 provides the abrasive particle according to any one of Embodiments 1-3, wherein the first and second cross-sectional areas are substantially the same.

Embodiment 5 provides the abrasive particle according to any one of Embodiments 1-4, wherein the first and second cross-sectional areas are different.

Embodiment 6 provides the abrasive particle according to any one of Embodiments 1-5, wherein the local minimum cross-sectional area is located at or near a mid-point of the axis of the elongated body.

Embodiment 7 provides the abrasive particle according to any one of Embodiments 1-6, wherein the local minimum cross-sectional area is located between a mid-point of the axis of the elongated body and one of the first or second ends.

Embodiment 8 provides the abrasive particle according to any one of Embodiments 1-7, wherein the local minimum cross-sectional area is at least 20 percent less than each of the first and second cross-sectional areas.

Embodiment 9 provides the abrasive particle according to any one of Embodiments 1-8, wherein the local minimum cross-sectional area is 20 percent to 40 percent less than both of the first and second cross-sectional areas.

Embodiment 10 provides the abrasive particle according to any one of Embodiments 1-9, wherein the particle comprises alpha-alumina.

Embodiment 11 provides the abrasive particle according to any one of Embodiments 1-10, wherein the particle has an aspect ratio of a length to a width of 3:1 to 6:1.

Embodiment 12 provides the abrasive particle according to any one of Embodiments 1-11, wherein the abrasive particle has an aspect ratio of a length to a width of at least 3:1.

Embodiment 13 provides the abrasive particle according to any one of Embodiments 1-12, wherein at least two cross-sectional areas between the first and second ends represent respective first and second local minimum cross-sectional areas.

Embodiment 14 provides the abrasive particle according to any one of Embodiments 1-13, wherein the first and second local minimum cross-sectional areas have about the same area.

Embodiment 15 provides the abrasive particle according to any one of Embodiments 1-14, wherein the first and second local minimum cross-sectional areas have different areas.

Embodiment 16 provides the abrasive particle according to any one of Embodiments 1-15, wherein a cross-sectional area between the first and second local minimum cross-sectional areas represents a local maximum cross-sectional area.

Embodiment 17 provides the abrasive particle according to any one of Embodiments 1-16, wherein the local maximum cross-sectional area is substantially the same as at least one of the first or second cross-sectional areas.

Embodiment 18 provides the abrasive particle according to any one of Embodiments 1-17, wherein the local maximum cross-sectional area is located substantially at a mid-point of the axis of the elongated body.

Embodiment 19 provides the abrasive particle according to any one of Embodiments 1-18, wherein the local maximum cross-sectional area is located between a mid-point of the axis of the elongated body and one of the first or second ends.

Embodiment 20 provides the abrasive particle according to any one of Embodiments 1-19, wherein the elongated body has a circular constant cross-sectional shape of varying cross-sectional area.

Embodiment 21 provides the abrasive particle according to any one of Embodiments 1-20, wherein the elongated body tapers from each of the first and second ends to the local minimum cross-sectional area.

Embodiment 22 provides the abrasive particle according to any one of Embodiments 1-21, wherein the elongated body has a polygonal cross-sectional shape of varying cross-sectional area.

Embodiment 23 provides the abrasive particle according to any one of Embodiments 1-22, wherein the elongated body has a polygonal constant cross-sectional shape of varying cross-sectional area.

Embodiment 24 provides the abrasive particle according to any one of Embodiments 1-23, wherein the elongated body comprises a plurality of faces defined between the first and second ends and each face is joined at an edge.

Embodiment 25 provides the abrasive particle according to any one of Embodiments 1-24, wherein the elongated body has a triangular cross-sectional shape of varying cross-sectional area.

Embodiment 26 provides the abrasive particle according to any one of Embodiments 1-25, wherein the elongated body has a triangular constant cross-sectional shape of varying cross-sectional area.

Embodiment 27 provides the abrasive particle according to any one of Embodiments 1-26, wherein the elongated body comprises:
a first face extending between the first and second ends;
a second face extending between the first and second ends;
a first edge between the first and the second faces;
a third face extending between the first and second ends;
a second edge between the second and third faces; and
a third edge between the third and first faces,
wherein at least one of the first, second, or third faces is tapered towards the local minimum cross sectional area.

Embodiment 28 provides the abrasive particle according to any one of Embodiments 1-27, wherein an angle between each of the first, second, and third faces is substantially 120 degrees.

Embodiment 29 provides the abrasive particle according to any one of Embodiments 1-28, wherein the tapered first, second, or third face has a linear profile.

Embodiment 30 provides the abrasive particle according to any one of Embodiments 1-29, wherein the tapered first, second, or third face has a curved profile.

Embodiment 31 provides the abrasive particle according to any one of Embodiments 1-30, wherein the elongated body has a square cross-sectional shape of varying cross-sectional area.

Embodiment 32 provides the abrasive particle according to any one of Embodiments 1-31, wherein the elongated body has a square constant cross-sectional shape of varying cross-sectional area.

Embodiment 33 provides the abrasive particle according to any one of Embodiments 1-32, wherein the elongated body comprises:
 a first face extending between the first and second ends;
 a second face extending between the first and second ends;
 a first edge between the first and second faces;
 a third face extending between the first and second ends;
 a second edge between the second and third faces;
 a fourth face extending between the first and second ends;
 a third edge between the third and fourth faces; and
 a fourth edge between the fourth and first faces,
 wherein at least one of the first, second, third or fourth faces is tapered towards the local minimum cross sectional area.

Embodiment 34 provides the abrasive particle according to any one of Embodiments 1-33, wherein the tapered first, second, third, or fourth face has a linear profile.

Embodiment 35 provides the abrasive particle according to any one of Embodiments 1-34, wherein the tapered first, second, third, or fourth face has a curved profile.

Embodiment 36 provides the abrasive particle according to any one of Embodiments 1-35, wherein the elongated body has a rectangular cross-sectional shape of varying cross-sectional area.

Embodiment 37 provides the abrasive particle according to any one of Embodiments 1-36, wherein the elongated body has a rectangular constant cross-sectional shape of varying cross-sectional area.

Embodiment 38 provides the abrasive particle according to any one of Embodiments 1-37, wherein an angle between at least two of the first, second, third, or fourth faces is less than 90 degrees.

Embodiment 39 provides the abrasive particle according to any one of Embodiments 1-38, wherein an angle between the first face and each of the second and fourth faces is less than 90 degrees.

Embodiment 40 provides the abrasive particle according to any one of Embodiments 1-39, wherein the elongated body comprises:
 a first face extending between the first and second ends;
 a second face extending between the first and second ends;
 a first edge between the first and second faces;
 a third face extending between the first and second ends;
 a second edge between the second and third faces;
 a fourth face extending between the first and second ends;
 a third edge between the third and fourth faces; and
 a fourth edge between the fourth and first faces,
 wherein at least one of the first, second, third or fourth faces is tapered towards the local minimum cross sectional area.

Embodiment 41 provides the abrasive particle according to any one of Embodiments 1-40, wherein the tapered first, second, third, or fourth face has a linear profile.

Embodiment 42 provides the abrasive particle according to any one of Embodiments 1-41, wherein the tapered first, second, third, or fourth face has a curved profile.

Embodiment 43 provides the abrasive particle according to any one of Embodiments 1-42, wherein an angle between at least two of the first, second, third, or fourth faces is less than 90 degrees.

Embodiment 44 provides the abrasive particle according to any one of Embodiments 1-43, wherein the local minimum cross-sectional area is located between a mid-point of the axis of the elongated body and one of the first or second ends.

Embodiment 45 provides the abrasive particle according to any one of Embodiments 1-44, wherein the elongated body has a trapezoidal cross-sectional shape of varying cross-sectional area.

Embodiment 46 provides the abrasive particle according to any one of Embodiments 1-45, wherein the elongated body has a trapezoidal constant cross-sectional shape of varying cross-sectional area.

Embodiment 47 the abrasive provides particle according to any one of Embodiments 1-46, wherein the elongated body comprises:
 a first portion having a first constant cross-sectional shape of varying cross-sectional area; and
 a second portion having a second constant cross-sectional shape of varying cross-sectional area, wherein the second cross-sectional shape is different than the first constant cross-sectional shape.

Embodiment 48 provides the abrasive particle according to any one of Embodiments 1-47, wherein the constant cross-sectional shape of the first portion and second portion is independently is chosen from a circular cross sectional shape, a triangular cross-sectional shape, a square cross-sectional shape, a rectangular cross-sectional shape, and a trapezoidal cross-sectional shape.

Embodiment 49 provides the abrasive particle according to any one of Embodiments 1-48, wherein the first portion comprises greater than fifty percent of a length of the elongated body along the axis.

Embodiment 50 provides the abrasive particle according to any one of Embodiments 1-49, wherein the second portion comprises greater than fifty percent of a length of the elongated body along the axis.

Embodiment 51 provides a plurality of abrasive particles according to any one of Embodiments 1-50.

Embodiment 52 provides a bonded abrasive article comprising a plurality of abrasive particles according to any one of Embodiments 1-51 retained in a binder material.

Embodiment 53 provides the bonded abrasive article according to any one of Embodiments 1-52, wherein the bonded abrasive article comprises a bonded abrasive wheel.

Embodiment 54 provides the bonded abrasive article according to any one of Embodiments 1-53, wherein the binder material comprises a vitreous binder material.

Embodiment 55 provides the bonded abrasive article according to any one of Embodiments 1-54, wherein the binder material comprises an organic binder material.

Embodiment 56 provides a method of forming the abrasive particle according to any one of Embodiments 1-55, comprising:
 placing a starting material mixture in a mold;
 curing the starting material in the mold, to provide the abrasive particle; and removing the abrasive particle from the mold.

Embodiment 57 a method of using the abrasive particle according to any one of Embodiments 1-56, comprising:
  incorporating the abrasive particle into a bonded abrasive article; and
  grinding a surface with the article.

Embodiment 58 provides a method of using a bonded abrasive article including the abrasive particle according to any one of Embodiments 1-57, comprising:
  grinding a surface with the article.

What is claimed is:

1. An abrasive particle comprising:
  a first face extending between a first end and a second end;
  a second face extending between the first and second ends;
  a first edge joining the first and the second faces;
  a third face extending between the first and second ends;
  a second edge joining the second and third faces;
  wherein at least one cross-sectional area between the first and second ends represents a local minimum cross-sectional area, perpendicular to one of the first, second or third face, at the local minimum cross-sectional area is an inflection point between the first and second ends, and wherein a surface perpendicular to the local minimum cross-sectional area is curved at the local minimum cross-sectional area; and
  wherein the particle has an aspect ratio of a length to a width of 3:1 to 6:1.

2. The abrasive particle of claim 1, wherein a first angle, at the first edge, is substantially 120 degrees.

3. The abrasive particle of claim 1, wherein the first, second, or third face has a linear profile.

4. The abrasive particle of claim 1, wherein the first, second, or third face has a curved profile.

5. The abrasive particle of claim 1, wherein the elongated body further comprises:
  a fourth face extending between the first and second ends;
  a third edge joining the third and fourth faces;
  a fourth edge between the fourth and first faces;
  and wherein the elongated body has a rectangular cross-sectional shape of varying cross-sectional area.

6. The abrasive particle of claim 5, wherein the elongated body has a square cross-sectional shape of varying cross-sectional area.

7. The abrasive particle of claim 5, wherein the elongated body has a square constant cross-sectional shape of varying cross-sectional area.

8. The abrasive particle of claim 5, wherein an angle between at least two of the first, second, third, or fourth faces is less than 90 degrees.

9. The abrasive particle of claim 5, wherein an angle between the first face and each of the second and fourth faces is less than 90 degrees.

10. The abrasive particle of claim 1, and further comprising: a fourth face extending between the first and second ends; a third edge between the third and fourth faces; and a fourth edge between the fourth and first faces, wherein at least one of the first, second, third or fourth faces is tapered towards the local minimum cross sectional area.

11. The abrasive particle of claim 1, wherein the elongated body has a trapezoidal cross-sectional shape of varying cross-sectional area.

12. The abrasive particle of claim 1, wherein the elongated body comprises: a first portion having a first constant cross-sectional shape of varying cross-sectional area; and a second portion having a second constant cross-sectional shape of varying cross-sectional area, wherein the second cross-sectional shape is different than the first constant cross-sectional shape.

13. The abrasive particle of claim 12, wherein the constant cross-sectional shape of the first portion and second portion is independently is chosen from a circular cross sectional shape, a triangular cross-sectional shape, a square cross-sectional shape, a rectangular cross-sectional shape, and a trapezoidal cross-sectional shape.

14. The abrasive particle of claim 12, wherein the first portion comprises greater than fifty percent of a length of the elongated body along the axis.

15. The abrasive particle of claim 12, wherein the second portion comprises greater than fifty percent of a length of the elongated body along the axis.

16. A bonded abrasive article comprising a plurality of abrasive particles, each of the plurality of abrasive particles comprising:
  a first face extending between a first end and a second end;
  a second face extending between the first and second ends;
  a first edge joining the first and the second faces;
  a third face extending between the first and second ends;
  a second edge joining the second and third faces;
  a third edge joining the third and first faces;
  wherein at least one cross-sectional area between the first and second ends is a local minimum cross-sectional area, perpendicular to one of the first, second or third face, and wherein at the local minimum cross-sectional area is an inflection point between the first and second ends, and wherein a surface perpendicular to the local minimum cross-sectional area is curved at the local minimum cross-sectional area; and
  wherein at least one of the first, second, or third faces is tapered towards the local minimum cross sectional area, and wherein an aspect ratio of a length to a width is no more than 1:6.

17. The abrasive article of claim 16, wherein the abrasive article comprises a bonded abrasive article.

18. The abrasive article of claim 17, wherein the binder material comprises a vitreous binder material.

19. The abrasive article of claim 18, wherein the binder material comprises an organic binder material.

20. A method of forming an abrasive particle, the method comprising:
  placing a starting material mixture in a mold;
  curing the starting material in the mold, to provide the abrasive particle, wherein, when cured, the abrasive particle comprises:
    a first face extending between a first end and a second end;
    a second face extending between the first and second ends;
    a first edge joining the first and the second faces;
    a third face extending between the first and second ends;
    a second edge joining the second and third faces;
    a third edge joining the third and first faces;
    wherein the first end has a first polygonal shape, and cross section, having a second polygonal shape, wherein the first polygonal shape is different from the second polygonal shape and wherein the cross section is between the first and second ends and represents a local minimum cross-sectional area, perpendicular to one of the first, second or third face, and wherein an aspect ratio of the abrasive particle is at least 3:1 and no more than 6:1; and wherein at least one of the first, second, or third faces is tapered towards the local minimum cross sectional area; and removing the abrasive particle from the mold.

* * * * *